(12) United States Patent
Malon

(10) Patent No.: US 10,929,453 B2
(45) Date of Patent: Feb. 23, 2021

(54) VERIFYING TEXTUAL CLAIMS WITH A DOCUMENT CORPUS

(71) Applicant: NEC Laboratories America, Inc., Princeton, NJ (US)

(72) Inventor: Christopher Malon, Fort Lee, NJ (US)

(73) Assignee: NEC CORPORATION

(*) Notice: Subject to any disclaimer, the term of this patent is extended or adjusted under 35 U.S.C. 154(b) by 88 days.

(21) Appl. No.: 16/522,727

(22) Filed: Jul. 26, 2019

(65) Prior Publication Data
US 2020/0050621 A1    Feb. 13, 2020

Related U.S. Application Data

(60) Provisional application No. 62/716,664, filed on Aug. 9, 2018.

(51) Int. Cl.
*G06F 16/35* (2019.01)
*G06F 16/93* (2019.01)

(52) U.S. Cl.
CPC ............ *G06F 16/355* (2019.01); *G06F 16/93* (2019.01)

(58) Field of Classification Search
CPC .............................. G06F 16/355; G06F 16/93
USPC ......................................................... 707/737
See application file for complete search history.

(56) References Cited

U.S. PATENT DOCUMENTS

| | | | | |
|---|---|---|---|---|
| 6,732,090 | B2* | 5/2004 | Shanahan | G06F 16/38 |
| 6,928,425 | B2* | 8/2005 | Grefenstette | G06F 16/38 |
| | | | | 715/209 |
| 7,133,862 | B2* | 11/2006 | Hubert | G06Q 30/0601 |
| 8,503,995 | B2* | 8/2013 | Ramer | G06Q 30/0256 |
| | | | | 455/414.1 |
| 2015/0339288 | A1* | 11/2015 | Baker | G06F 40/166 |
| | | | | 704/9 |
| 2019/0138597 | A1* | 5/2019 | Dowell | H04L 65/40 |
| 2019/0266257 | A1* | 8/2019 | Natchu | G06F 16/95 |

(Continued)

OTHER PUBLICATIONS

Ba et al., "Layer Normalization", normalizaarXiv:1607.06450v1 [stat.ML] Jul. 21, 2016, pp. 1-14.

(Continued)

*Primary Examiner* — Dung K Chau
(74) *Attorney, Agent, or Firm* — Joseph Kolodka

(57) ABSTRACT

A system verifies textual claims using a document corpus. The system includes a memory for storing program code and a processor device for running the code to retrieve documents from the corpus based on Term Frequency Inverse Document Frequency (TFIDF) similarity to a set of textual claims. The processor extracts named entities and capitalized phrases from the textual claims. The processor retrieves documents from the corpus with titles matching any of the extracted named entities and capitalized phrases. The processor extracts premise sentences from the retrieved documents. The processor classifies the premise sentences together with sources of the premises sentences against the textual claims to obtain classifications from among possible classifications including a supported, an unverified, or a contradicted classification. The processor aggregates the classifications over the premise sentences to selectively output, for each textual claim, an overall decision of the supported classification, the unverified classification, or the contradicted classification.

19 Claims, 4 Drawing Sheets

(56) References Cited

U.S. PATENT DOCUMENTS

2020/0004876 A1* 1/2020 Sinha ................. G06F 16/3344
2020/0026772 A1* 1/2020 Wheeler ............. G06F 16/9535

OTHER PUBLICATIONS

Bowman et al., "A large annotated corpus for learning natural language inference", Arxiv.org, Aug. 2015, 11 pages.

Natural Language Processing (Almost) from Scratch, Chen at al., "Enhanced LSTM for Natural Language Inference", Proceedings of the 55th Annual Meeting of the Association for Computational Linguistics, Aug. 2017, pp. 1657-1668.

Collobert et al., "Natural Language Processing (Almost) from Scratch", Journal of Machine Learning Research 12 , Aug. 2011, pp. 2493-2537.

Conneau et al., "Supervised Learning of Universal Sentence Representations from Natural Language Inference Data", Proceedings of the 2017 Conference on Empirical Methods in Natural Language Processing, Sep. 2017, pp. 670-680.

Gardner et al., "AllenNLP: A Deep Semantic Natural Language Processing Platform", Proceedings of Workshop for NLP Open Source Software, Jul. 2018, pp. 1-6.

Glockner et al., "Breaking NLI Systems with Sentences that Require Simple Lexical Inferences", Proceedings of the 56th Annual Meeting of the Association for Computational Linguistics (Short Papers), Jul. 2019, pp. 650-655.

GoodFellow et al., "Generative Adversarial Nets", : Advances in Neural Information Processing Systems 27 (NIPS 2014), Dec. 2014, pp. 1-9.

Gururangan et al., "Annotation Artifacts in Natural Language Inference Data", Proceedings of NAACL-HLT Jun. 2018, pp. 107-112.

Honnibal et al., "An Improved Non-monotonic Transition System for Dependency Parsing", Proceedings of the 2015 Conference on Empirical Methods in Natural Language Processing, Sep. 2015, pp. 1373-1378.

Jia et al., "Adversarial Examples for Evaluating Reading Comprehension Systems", Proceedings of the 2017 Conference on Empirical Methods in Natural Language Processing, Sep. 2017, pp. 2021-2031.

Kang et al., "AdvEntuRe: Adversarial Training for Textual Entailment with Knowledge-Guided Examples", Proceedings of the 56th Annual Meeting of the Association for Computational Linguistics (Long Papers), Jul. 2018, pp. 2418-2428.

Khot et al., "SCITAIL: A Textual Entailment Dataset from Science Question Answering", Association for the Advancement of Artificial Intelligence (www.aaai.org), Apr. 2018, pp. 3-9.

Naik et al., "Stress Test Evaluation for Natural Language Inference", Proceedings of the 27th International Conference on Computational Linguistics, Aug. 2018, pp. 2340-2353.

Nie at al., "Shortcut-Stacked Sentence Encoders for Multi-Domain Inference", Proceedings of the 2nd Workshop on Evaluating Vector-Space Representations for NLP, Sep. 2017, pp. 41-45.

Parikh et al., "A Decomposable Attention Model for Natural Language Inference", Proceedings of the 2016 Conference on Empirical Methods in Natural Language Processing, Nov. 2016, pp. 2249-2255.

Pennington et al., "GloVe: Global Vectors for Word Representation", Proceedings of the 2014 Conference on Empirical Methods in Natural Language Processing (EMNLP), Oct. 2014, 12 pages.

Peters et al., "Deep contextualized word representations", Proceedings of NAACL-HLT 2018, Jun. 2018, pp. 2227-2237.

Poliak et al., "Hypothesis Only Baselines in Natural Language Inference", Proceedings of the 7th Joint Conference on Lexical and Computational Semantics (*SEM), Jun. 2018, pp. 180-191.

Radford et al., "Improving Language Understanding by Generative Pre-Training", Semantic Scholar Aug. 2018, pp. 1-12.

Rajpurkar et al., "SQuAD: 100,000+ Questions for Machine Comprehension of Text", Proceedings of the 2016 Conference on Empirical Methods in Natural Language Processing, Nov. 2016, pp. 2383-2392.

Ribeiro et al., "Semantically Equivalent Adversarial Rules for Debugging NLP Models", Proceedings of the 56th Annual Meeting of the Association for Computational Linguistics (Long Papers), Jul. 2018, pp. 856-865.

Sennrich et al., "Neural Machine Translation of Rare Words with Subword Units", Proceedings of the 54th Annual Meeting of the Association for Computational Linguistics, Aug. 2016, pp. 1715-1725.

Shen et al., "Baseline Needs More Love: On SimpleWord-Embedding-Based Models and Associated Pooling Mechanisms", Proceedings of the 56th Annual Meeting of the Association for Computational Linguistics (Long Papers), Jul. 2018, pp. 440-450.

Thorne et al., "FEVER: a large-scale dataset for Fact Extraction and VERification", Proceedings of NAACL-HLT 2018, Jun. 2018, pp. 809-819.

Tsuchiya, Masatoshi, "Performance Impact Caused by Hidden Bias of Training Data for Recognizing Textual Entailment", arXiv.org > cs > arXiv:1804.08117, Apr. 2018, pp. 1506-1511.

Vaswani et al., "Attention Is All You Need", 31st Conference on Neural Information Processing Systems (NIPS 2017), Dec. 2017, pp. 1-11.

Williams et al., "A Broad-Coverage Challenge Corpus for Sentence Understanding through Inference", Proceedings of NAACL-HLT 2018, Jun. 2018, pp. 1112-1122.

Young et al., "From image descriptions to visual denotations: New similarity metrics for semantic inference over event descriptions", Transactions of the Association for Computational Linguistics, 2 (2014), Feb. 2014, pp. 67-78.

Zhao et al., "Generating Natural Adversarial Examples", Published as a conference paper at ICLR 2018, May 2018, pp. 1-15.

Zhu et al., "Aligning Books and Movies: Towards Story-like Visual Explanations by Watching Movies and Reading. Books", arXiv.org > cs > arXiv:1506.06724, Jun. 2015, pp. 19-27.

* cited by examiner

VERIFYING TEXTUAL CLAIMS WITH A DOCUMENT CORPUS

RELATED APPLICATION INFORMATION

This application claims priority to U.S. Provisional Patent Application Ser. No. 62/716,664, filed on Aug. 9, 2018, incorporated herein by reference in its entirety.

BACKGROUND

Technical Field

The present invention relates to information processing and more particularly to verifying textual claims with a document corpus.

Description of the Related Art

Currently, a myriad of textual claims can be uncovered when perusing the Internet. However, there exists a problem in verifying these textual claims. Hence, there is a need for an approach to verifying textual claims.

SUMMARY

According to an aspect of the present invention, a system is provided for verifying textual claims using a document corpus. The system includes a memory for storing program code. The system further includes a processor device for running the program code to retrieve documents from the document corpus based on Term Frequency Inverse Document Frequency (TFIDF) similarity to a set of textual claims. The processor further runs the program code to extract named entities and capitalized phrases from the textual claims. The processor also runs the program code to retrieve documents from the document corpus with titles matching any of the extracted named entities and capitalized phrases. The processor additionally runs the program code to extract premise sentences from the retrieved documents. The processor further runs the program code to classify the premise sentences together with sources of the premises sentences against the textual claims to obtain classifications from among possible classifications including a supported classification, an unverified classification, or a contradicted classification. The processor additionally runs the program code to aggregate the classifications over the premise sentences to selectively output, for each of the textual claims, an overall decision of the supported classification, the unverified classification, or the contradicted classification.

According to another aspect of the present invention, a computer-implemented method is provided for verifying textual claims using a document corpus. The method includes retrieving, by a processor device, documents from the document corpus based on Term Frequency Inverse Document Frequency (TFIDF) similarity to a set of textual claims. The method further includes extracting, by the processor device, named entities and capitalized phrases from the textual claims. The method also includes retrieving, by the processor device, documents from the document corpus with titles matching any of the extracted named entities and capitalized phrases. The method additionally includes extracting, by the processor device, premise sentences from the retrieved documents. The method further includes classifying, by the processor device, the premise sentences together with sources of the premises sentences against the textual claims to obtain classifications from among possible classifications including a supported classification, an unverified classification, or a contradicted classification. The method also includes aggregating, by the processor device, the classifications over the premise sentences to selectively output, for each of the textual claims, an overall decision of the supported classification, the unverified classification, or the contradicted classification.

According to yet another aspect of the present invention, a computer program product is provided for verifying textual claims using a document corpus. The computer program product includes a non-transitory computer readable storage medium having program instructions embodied therewith. The program instructions are executable by a computer to cause the computer to perform a method. The method includes retrieving, by a processor device, documents from the document corpus based on Term Frequency Inverse Document Frequency (TFIDF) similarity to a set of textual claims. The method further includes extracting, by the processor device, named entities and capitalized phrases from the textual claims. The method also includes retrieving, by the processor device, documents from the document corpus with titles matching any of the extracted named entities and capitalized phrases. The method additionally includes extracting, by the processor device, premise sentences from the retrieved documents. The method further includes classifying, by the processor device, the premise sentences together with sources of the premises sentences against the textual claims to obtain classifications from among possible classifications including a supported classification, an unverified classification, or a contradicted classification. The method also includes aggregating, by the processor device, the classifications over the premise sentences to selectively output, for each of the textual claims, an overall decision of the supported classification, the unverified classification, or the contradicted classification.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to verifying textual claims with a document corpus. While one or more embodiments described the document corpus as Wikipedia, other document corpuses can also be used, as readily appreciated by one of ordinary skill in the art given the teachings of the present invention provided herein, while maintaining the spirit of the present invention.

In an embodiment, a system and corresponding method are provided for fact extraction and verification challenge that use a high precision entailment classifier based on transformer networks pretrained with language modeling, to classify a broad set of potential evidence. The articles best matching the claim text by TFIDF score are retrieved and additional articles whose titles match named entities and capitalized expressions occurring in the claim text are also read and can be included depending upon the implementation. The entailment module evaluates potential evidence from the retrieved articles one statement at a time, together with the title of the page the evidence came from (providing a hint about possible pronoun antecedents).

Figure 1:
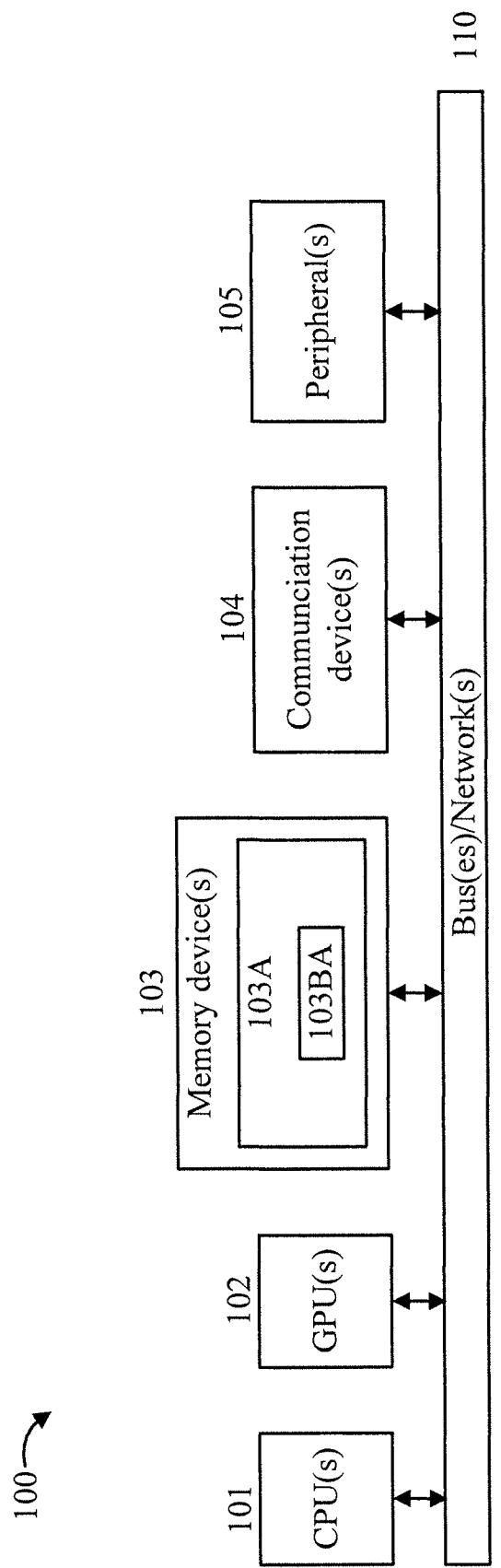
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

In an embodiment, the one or more memory devices 103 include an entailment module 103A based on a transformer network 103B. In another embodiment, the entailment module 103A and transformer network 103B can be implemented as special purpose hardware (e.g. Application Specific Integrated Circuits, and so forth).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
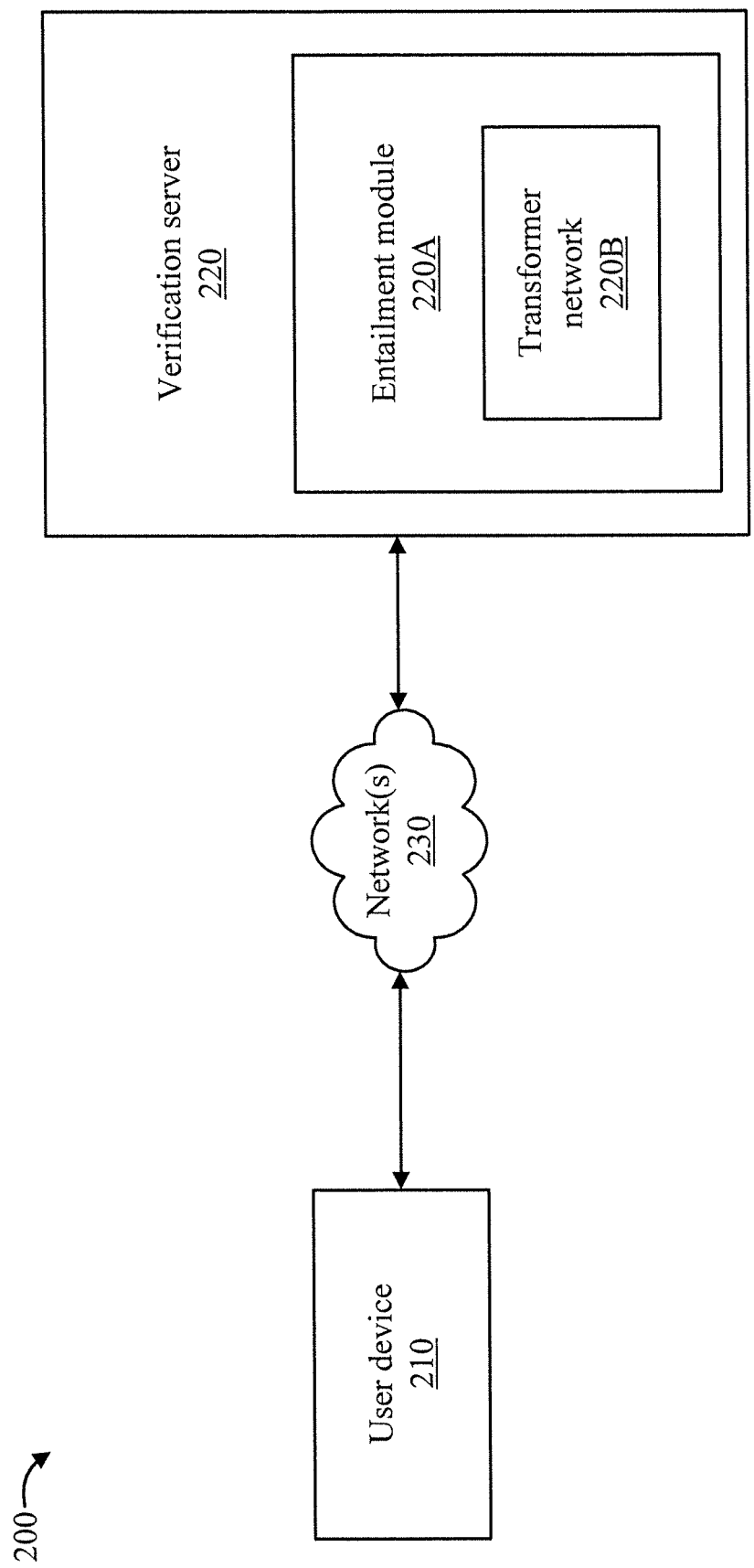
FIG. 2 is a diagram showing an exemplary environment to which the present invention can be applied, in accordance with an embodiment of the present invention.

FIG. 2 is a diagram showing an exemplary environment 200 to which the present invention can be applied, in accordance with an embodiment of the present invention.

The environment 200 includes a user device 210 operatively coupled to a verification server 220 via one or more networks (collectively denoted by the figure reference numeral 230).

A user 290 of the user device 210 submits a set of textual claims to be verified to the verification server 220. The verification server 220 evaluates the textual claims as described herein in order to classify the textual claim as "supported", "unverified", or "contradicted".

The verification server 220 can be part of another system such as a news system, an information system, a data-verifying data repository (only storing supported information, etc.), and so forth.

In an embodiment, the verification server 220 includes an entailment module 220A based on a transformer network 220B. The entailment module 220A decides upon the relation between sentences (or lists of sentences) A and B, as "supported" (i.e., if A, then B, or if A is true, then B must be true), "contradicted" (i.e., if A, then not B, or if A is true, then B must not be true), or "unverified" (i.e., if A is true, then B may or may not be true).

Figure 3:
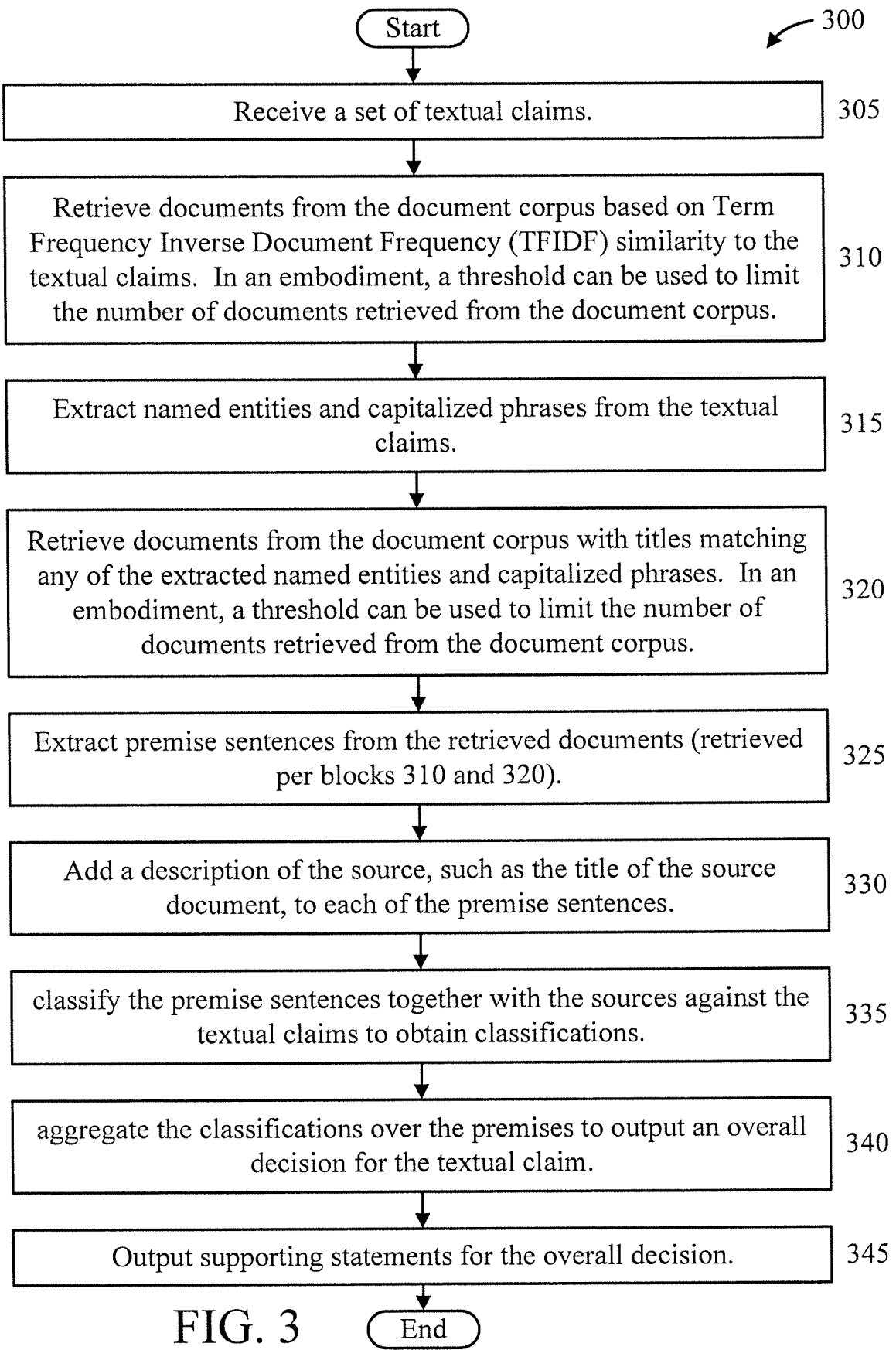
FIG. 3 is a diagram showing an exemplary method for verifying textual claims with a document corpus, in accordance with an embodiment of the present invention.

FIG. 3 is a diagram showing an exemplary method 300 for verifying textual claims with a document corpus, in accordance with an embodiment of the present invention.

At block 305, receive a set of textual claims.

At block 310, retrieve documents from the document corpus based on Term Frequency Inverse Document Frequency (TFIDF) similarity to the textual claims. In an embodiment, a threshold can be used to limit the number of documents retrieved from the document corpus.

At block 315, extract named entities and capitalized phrases from the textual claims.

At block 320, retrieve documents from the document corpus with titles matching any of the extracted named entities and capitalized phrases. In an embodiment, a threshold can be used to limit the number of documents retrieved from the document corpus. In an embodiment, the same threshold is used as in block 310. In another embodiment, a different threshold can be used relative to that used in block 310.

At block 325, extract premise sentences from the retrieved documents (retrieved per blocks 310 and 320). A premise statement is a statement from the retrieved documents of the document corpus that can be used as evidence to possibly support or refute a textual claim.

At block 330, add a description of the source, such as the title of the source document, to each of the premise sentences.

At block 335, classify the premise sentences together with the sources against the textual claims to obtain classifications.

At block 340, aggregate the classifications over the premises to output an overall decision for the textual claim.

In an embodiment, block 340 can include block 340A.

At block 340A, output supporting statements for the overall decision.

Figure 4:
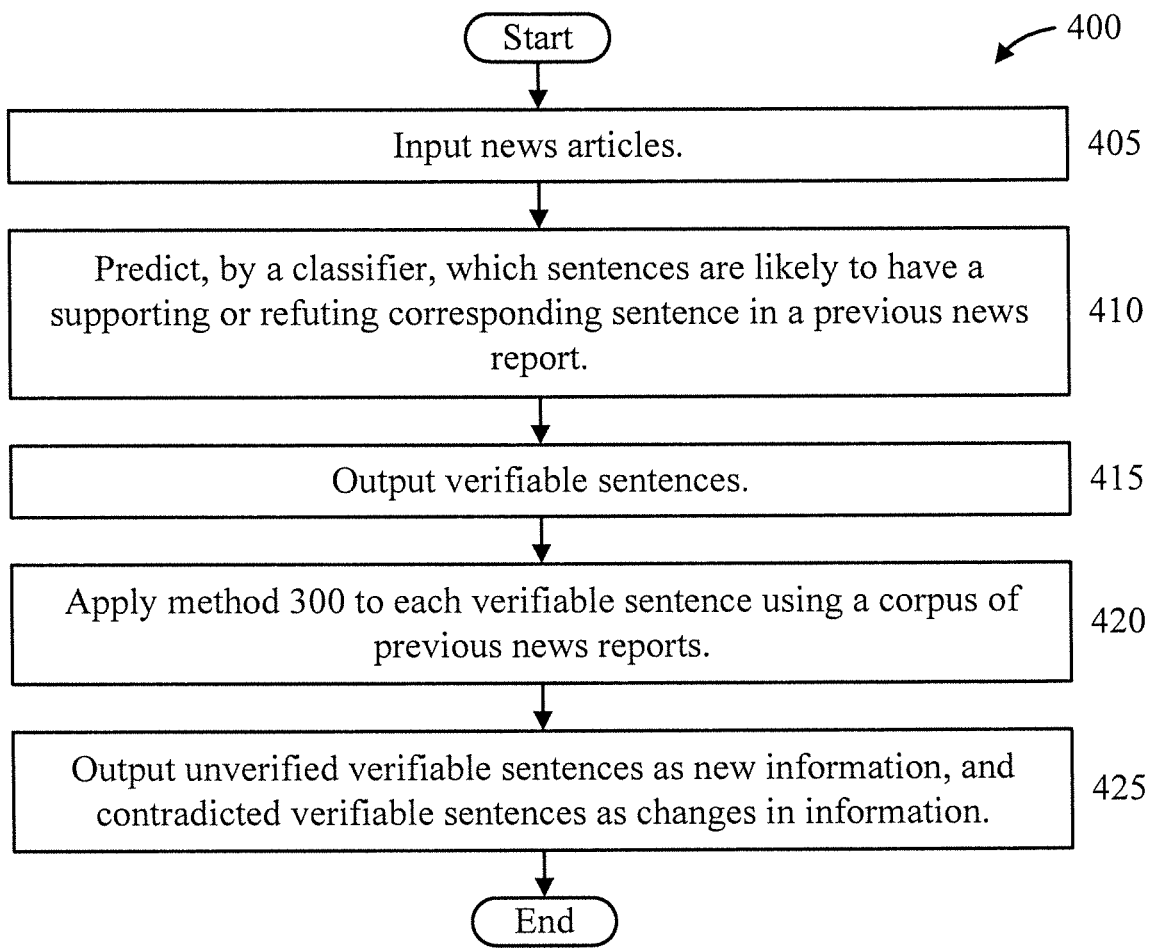
FIG. 4 is a flow diagram showing an exemplary method for summarizing news articles, in accordance with an embodiment of the present invention.

FIG. 4 is a flow diagram showing an exemplary method 400 for summarizing news articles in accordance with an embodiment of the present invention.

At block 405, input news articles.

At block 410, predict, by a classifier, which sentences are likely to have a supporting or refuting corresponding sentence in a previous news report.

At block 415, output verifiable sentences.

At block 420, apply method 300 to each verifiable sentence using a corpus of previous news reports.

At block 425, output unverified verifiable sentences as new information, and contradicted verifiable sentences as changes in information.

A description will now be given regarding a transformer network to which the present invention can be applied, in accordance with an embodiment of the present invention.

In an embodiment, a core element of the present invention is an entailment module based on a transformer network. Transformer networks are deep networks applied to sequential input data, with each layer implementing multiple heads of scaled dot product attention. This attention mechanism allows deep features to be compared across positions in the input.

Many entailment networks have two sequence inputs, but the transformer is designed with just one. A separator token divides the premise from the hypothesis.

A specific transformer network can be used that has been pre-trained for language modeling. The network includes twelve blocks. Each block includes a multi-head masked self-attention layer, layer normalization, a feed forward network, and another layer normalization. After the twelfth block, two branches exist. In one branch, matrix multiplication and softmax layers are applied at the terminal sequence position to predict the entailment classification. In the other branch (the "language modeling branch"), a hidden state is multiplied by each token embedding and a softmax is taken to predict the next token. The language modeling branch has been pre-trained on a dataset. Using the pre-trained model, both branches are trained on examples.

In an embodiment, block 330 inserts the title of the source document of each premise sentence. Any underscores in the page title are converted to spaces, and the title is inserted between brackets before the rest of the premise sentence.

A description will now be given regarding training an entailment module, in accordance with an embodiment of the present invention.

In an embodiment, premise statements are individually evaluated.

In an embodiment, ground truth claim classifications and ground truth evidence sentences are provided as training data, and premises are collected as a number of sentences (here, five sentences) with the highest TFIDF scores against the claim, taken from pages in the document corpus selected by the retrieval module. Each sentence is labeled with the truth value of the claim if it is in the ground truth evidence set, and labeled as "neutral" if not. The resulting data forms an entailment problem referred to herein as "Problem One." For comparison, "Problem Five" and "Problem Five Oracle" are formed by concatenating all five retrieved sentences. In Problem Five Oracle, the ground truth is the claim ground truth (if verifiable), but in Problem Five, the ground truth depends on whether the retrieved evidence is in the ground truth evidence set.

If the entailment module is trained on Problem One, the classifier in block 335 is applied to each premise sentence individually against the hypothesis. If the entailment module is trained on Problem Five or Problem Five Oracle, the classifier in block 335 is applied to five premise sentences concatenated together, against the hypothesis sentence.

For Problem Five or Problem Five Oracle, the overall decision in block 340 is the decision output by the entailment classifier on five premise sentences together. For Problem One, decisions about individual sentences of possible evidence by block 335 are aggregated to form a decision about the textual claim. This is achieved by applying the following rules:

(1) If any piece of evidence supports the claim, the claim is classified as supported.

(2) If any piece of evidence refutes the claim, but no piece of evidence supports it, the claim is classified as refuted.

(3) If no piece of evidence supports or refutes the claim, the claim is classified as not having enough information (indeterminate).

Conflicts between supporting and refuting information are resolved in favor of the supporting information, because cases in the development data were observed where information was retrieved for different entities with the same name. For example, Ann Richards appeared both as a governor of Texas and as an Australian actress. Information that would be a contradiction regarding the actress should not stop evidence that would support a claim about the politician.

Various embodiments of this invention apply an entailment module based on an Enhanced Sequential Inference Model (ESIM) or transformer networks to solve Problem Five, Problem Five Oracle, or Problem One. A suitable description of an ESIM to which the present invention can be applied can be found in the following: "Enhanced LSTM for Natural Language Inference", Proceedings of the 55$^{th}$ Annual Meeting of the Association for Computational Linguistics (ACL 2017), July 2017, by Qian Chen, Xiaodan Zhu, Zhen-Hua Ling, Si Wei, Hui Jiang, and Diana Inkpen, the disclosure of which is incorporated herein in its entirety. A suitable description of a transformer network to which the present invention can be applied can be found in the following: "Attention is All You Need", Advances in Neural Information Processing Systems 30 (NIPS 2017), December 2017, by Ashish Vaswani, Noam Shazeer, Niki Parmar, Jakob Uszkoreit, Llion Jones, Aidan Gomez, Lukasz Kaiser, and Illia Polosukhin, the disclosure of which is incorporated herein in its entirety.

A description will now be given regarding retrieval, in accordance with an embodiment of the present invention.

Regardless of how strong the entailment classifier is, claim classification accuracy is limited by whether the retrieval module finds the right evidence. The evidence retrieval rate is defined as the percentage of claims for which correct evidence is retrieved, before filtering with the entailment classifier.

In a preferred embodiment of block 325, the title is added to each premise statement when computing its TFIDF against the claim. This boosts the score of statements from a relevant article even if the subject is not mentioned explicitly in the sentence.

In one implementation of block 320, pages are retrieved whose title exactly matches a capitalized phrase or extracted named entity from a claim.

In the case where the document corpus is Wikipedia, sometimes the named entity page thus retrieved is only a Wikipedia disambiguation page with no useful information. An alternate embodiment of block 320 retrieves not only pages with a title exactly matching the extracted named entity "Y", but also a page titled "Y (film)" if it existed.

In one embodiment of block 325, the extracted premise sentences are the five sentences from the retrieved documents with the highest TFIDF score against the premise (possibly with the title added, as mentioned above). In an alternative embodiment, all the sentences from each article, up to the first fifty, are retrieved. This alternative may raise the evidence retrieval rate at the expense of more work for the entailment module. Of course, other numbers of sentences can be used.

A description will now be given regarding various scenarios to which the present invention can be applied, in accordance with an embodiment of the present invention.

A description will now be given regarding a fact checking scenario, in accordance with an embodiment of the present invention.

A document corpus could be any collection of news articles, encyclopedia articles, or reports retrieved from the Web. Thus, for an input claim asserting that the United States has imposed trade tariffs on Chinese goods, the present invention could retrieve supporting statements from news articles from each of the historical times that tariffs were applied, automatically excluding statements and articles which may be generally about tariffs or Chinese goods but do not actually describe the application of a tariff by the United States on Chinese goods.

As another example, a description will now be given regarding news novelty, in accordance with an embodiment of the present invention.

A system can maintain a corpus of past news articles and receive an incoming news article. A first classifier considers each sentence of the news article and predicts which sentences are likely to have a corresponding sentence in a previous article, without actually considering any previous articles.

Then, the system runs method 300 of FIG. 3 on each of those statements to output "supported", "unverified", or "contradicted" for each of the statements.

The new statements which are "unverified" with respect to the corpus of previous articles are highlighted as potential new information, and the new statements which are classified as "contradiction" are highlighted as changes in previous information.

It is to be appreciated that the preceding use scenarios are merely illustrative and, thus, the present invention can be used with those as well as a myriad of other possible scenarios, as readily envisioned by one of ordinary skill in the art, given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for verifying textual claims using a document corpus, comprising:
    a memory for storing program code; and
    a processor device for running the program code to
        retrieve documents from the document corpus based on Term Frequency Inverse Document Frequency (TFIDF) similarity to a set of textual claims;
        extract named entities and capitalized phrases from the textual claims;
        retrieve documents from the document corpus with titles matching any of the extracted named entities and capitalized phrases;
        extract premise sentences from the retrieved documents;
        classify the premise sentences together with sources of the premises sentences against the textual claims to obtain classifications from among possible classifications including a supported classification, an unverified classification, or a contradicted classification; and
        aggregate the classifications over the premise sentences to selectively output, for each of the textual claims, an overall decision of the supported classification, the unverified classification, or the contradicted classification.

2. The system of claim 1, wherein the processor device further outputs supporting statements for the overall decision from the document corpus.

3. The system of claim 1, wherein the processor adds a title of a source document to each of the premise sentences.

4. The system of claim 1, wherein the title of the source document is added before a corresponding one of the premise statements.

5. The system of claim 1, wherein the system is comprised in a news summarization system.

6. The system of claim 1, wherein the processor retrieves the documents from the document corpus using a threshold on an overall number of the documents retrieved from the document corpus to limit a number of processed document from the document corpus for each of multiple retrievals.

7. The system of claim 1, wherein each of the premise sentences is individually classified together with a corresponding one of the sources against the textual claims to obtain the classifications for each of the textual claims.

8. The system of claim 1, wherein concatenated sets of the premise statements are classified together with corresponding ones of the sources against the textual claims to obtain the classifications for each of the textual claims.

9. The system of claim 1, wherein the processor device biases the overall decision by resolving conflicts between supporting and refuting information in favor of the supporting information.

10. A computer-implemented method for verifying textual claims using a document corpus, comprising:

retrieving, by a processor device, documents from the document corpus based on Term Frequency Inverse Document Frequency (TFIDF) similarity to a set of textual claims;

extracting, by the processor device, named entities and capitalized phrases from the textual claims;

retrieving, by the processor device, documents from the document corpus with titles matching any of the extracted named entities and capitalized phrases;

extracting, by the processor device, premise sentences from the retrieved documents;

classifying, by the processor device, the premise sentences together with sources of the premises sentences against the textual claims to obtain classifications from among possible classifications including a supported classification, an unverified classification, or a contradicted classification; and aggregating, by the processor device, the classifications over the premise sentences to selectively output, for each of the textual claims, an overall decision of the supported classification, the unverified classification, or the contradicted classification.

11. The computer-implemented method of claim 10, wherein the processor device further outputs supporting statements for the overall decision from the document corpus.

12. The computer-implemented method of claim 10, wherein the processor adds a title of a source document to each of the premise sentences.

13. The computer-implemented method of claim 10, wherein the title of the source document is added before a corresponding one of the premise statements.

14. The computer-implemented method of claim 10, wherein the system is comprised in a news summarization system.

15. The computer-implemented method of claim 10, wherein each of the retrieving steps involve a respective threshold on an overall number of the documents retrieved from the document corpus to limit a number of processed document from the document corpus.

16. The computer-implemented method of claim 10, wherein each of the premise sentences is individually classified together with a corresponding one of the sources against the textual claims to obtain the classifications for each of the textual claims.

17. The computer-implemented method of claim 10, wherein concatenated sets of the premise statements are classified together with corresponding ones of the sources against the textual claims to obtain the classifications for each of the textual claims.

18. The computer-implemented method of claim 10, further comprising biasing the overall decision by resolving conflicts between supporting and refuting information in favor of the supporting information.

19. A computer program product for verifying textual claims using a document corpus, the computer program product comprising a non-transitory computer readable storage medium having program instructions embodied therewith, the program instructions executable by a computer to cause the computer to perform a method comprising:

retrieving, by a processor device, documents from the document corpus based on Term Frequency Inverse Document Frequency (TFIDF) similarity to a set of textual claims;

extracting, by the processor device, named entities and capitalized phrases from the textual claims;

retrieving, by the processor device, documents from the document corpus with titles matching any of the extracted named entities and capitalized phrases;

extracting, by the processor device, premise sentences from the retrieved documents;

classifying, by the processor device, the premise sentences together with sources of the premises sentences against the textual claims to obtain classifications from among possible classifications including a supported classification, an unverified classification, or a contradicted classification; and aggregating, by the processor device, the classifications over the premise sentences to selectively output, for each of the textual claims, an overall decision of the supported classification, the unverified classification, or the contradicted classification.

* * * * *